United States Patent
Loce et al.

(10) Patent No.: US 8,610,963 B2
(45) Date of Patent: Dec. 17, 2013

(54) IMAGE CORNER SHARPENING METHOD AND SYSTEM

(75) Inventors: Robert P. Loce, Webster, NY (US); Edgar A. Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 922 days.

(21) Appl. No.: 12/719,931

(22) Filed: Mar. 9, 2010

(65) Prior Publication Data

US 2011/0222127 A1    Sep. 15, 2011

(51) Int. Cl.
  *G06T 5/00*    (2006.01)
(52) U.S. Cl.
  USPC .......... 358/3.27; 382/268; 382/209; 382/218; 382/266; 358/447
(58) Field of Classification Search
  None
  See application file for complete search history.

(56) References Cited

U.S. PATENT DOCUMENTS

| | | | |
|---|---|---|---|
| 4,437,122 A | 3/1984 | Walsh et al. | |
| 4,847,641 A | 7/1989 | Tung | |
| 5,383,036 A | 1/1995 | Mailloux | |
| 6,144,461 A | 11/2000 | Crean et al. | |
| 6,167,166 A | 12/2000 | Loce et al. | |
| 6,243,499 B1 | 6/2001 | Loce et al. | |
| 6,775,410 B1* | 8/2004 | Loce et al. | 382/209 |
| 7,518,618 B2 | 4/2009 | Loce et al. | |
| 7,536,052 B2 | 5/2009 | Saber et al. | |
| 7,539,351 B2 | 5/2009 | Xu et al. | |
| 7,636,480 B2 | 12/2009 | Zhang et al. | |
| 2006/0279749 A1 | 12/2006 | Zhang et al. | |
| 2007/0146796 A1* | 6/2007 | Loce et al. | 358/3.27 |

OTHER PUBLICATIONS

U.S. Appl. No. 12/609,475, filed Oct. 30, 2009, Zhang et al.
U.S. Appl. No. 12/240,941, filed Apr. 9, 2009, Loce et al.
Smith et al., SUSAN—A New Approach to Low Level Image Processing; International Journal of Computer Vision 23(I), pp. 45-78; ©1997 Kluwer Academic Publishers, Manufactured in The Netherlands.
Richard Rubinstein, "Digital Typography: An Introduction to Type and Composition for Computer System Design," Addison-Wesley, pp. 78-81, 1988.

* cited by examiner

*Primary Examiner* — Twyler Haskins
*Assistant Examiner* — Christopher D Wait
(74) *Attorney, Agent, or Firm* — Faye Sharpe LLP

(57) ABSTRACT

An image processing system, apparatus and method are disclosed for corner enhancing a digital image for rendering on an image output device. According to one exemplary method, pixels associated with corner regions of the digital image are determined using a plurality of vector windows. Subsequently, one or more corner pixels are modified to sharpen the rendering of the digital image on the image output device.

23 Claims, 8 Drawing Sheets

$C_L = 28$
$C_H = 21$
FOREGROUND PIXEL COUNT = MIN[ $C_H$, $C_L$ ] = 21
BACKGROUND PIXEL COUNT = MAX[ $C_H$, $C_L$ ] = 28
FOREGROUND COUNT / BACKGROUND COUNT = 0.75

$C_L = 40$
$C_H = 9$
FOREGROUND PIXEL COUNT = MIN[ $C_H$, $C_L$ ] = 9
BACKGROUND PIXEL COUNT = MAX[ $C_H$, $C_L$ ] = 40
FOREGROUND COUNT / BACKGROUND COUNT = 0.225

$C_L = 9$
$C_H = 40$
FOREGROUND PIXEL COUNT = MIN[ $C_H$, $C_L$ ] = 9
BACKGROUND PIXEL COUNT = MAX[ $C_H$, $C_L$ ] = 40
FOREGROUND COUNT / BACKGROUND COUNT = 0.225

$C_L = 41$
$C_H = 8$
FOREGROUND PIXEL COUNT = MIN[ $C_H$, $C_L$ ] = 8
BACKGROUND PIXEL COUNT = MAX[ $C_H$, $C_L$ ] = 41
FOREGROUND COUNT / BACKGROUND COUNT = 0.195

IMAGE CORNER SHARPENING METHOD AND SYSTEM

CROSS REFERENCE TO RELATED PATENTS AND APPLICATIONS

The following patents and patent applications are incorporated herein by reference in their entirety.

U.S. Pat. No. 7,536,052, by Saber et al., entitled "CORNER SHARPENING OF TEXT AND LINE ART IN A SUPER RESOLUTION ANTI-ALIASING IMAGE PATH," published May 19, 2009.

U.S. Pat. No. 6,775,410, by Loce et al., entitled "IMAGE PROCESSING METHOD FOR SHARPENING CORNERS OF TEXT AND LINE ART," issued Aug. 10, 2004.

U.S. Pat. No 6,243,499, by Loce et al., entitled "TAGGING OF ANTIALIASED IMAGES," issued Jun. 5, 2001.

U.S. Pat. No. 6,167,166, by Loce et al., entitled "METHOD TO ENABLE THE RECOGNITION AND RENDERING OF ANTIALIASED IMAGES," issued Dec. 26, 2000.

U.S. Patent Application Publication No. 2006/0279749, by Zhang et al., entitled "SUPER RESOLUTION ENCODING," published Dec. 14, 2006.

U.S. patent application Ser. No. 12/420,941, by Loce et al., entitled "SYSTEM & METHOD OF IMAGE EDGE GROWTH," filed Apr. 9, 2009.

U.S. patent application Ser. No. 12/609,475, by Zhang et al., entitled "SUSAN-BASED CORNER SHARPENING," filed Oct. 30, 2009.

BACKGROUND

This disclosure relates to a methodology for improving the print quality of line-art corners and other fine details as found in both font and image data. Due to the nature of inks, paper and printing, these types of problems are well known in the printing arts.

In the printing arts this problem was typically overcome by manual image customization by hand of any troublesome detail areas. This was particularly the case with fonts or reusable type. For example, ink traps would be added to those areas in a font character where too much ink would otherwise collect and cause smearing. Similarly, detail areas would be sharpened to ensure the desired print result.

This approach of compensating to get a desired result such as sharpening has followed-on from the print arts into the digital imaging arts. As an example, "Digital Typography: An Introduction to Type and Composition for Computer System Design," by Richard Rubinstein, discusses the desirability of compensating for electrostatic effects which result in toner not being placed on the paper exactly as the bit image specifies. Compensation is depicted there as adding to the image bit map to sharpen convex (outside) corners which would otherwise get rounded over. An alternative compensation is also depicted for handling situations involving concave (inside) corners by removing black printing pixels from the corner region of a shape to make an ink trap. In FIG. 2 there is depicted the bit image data and thereby the desired print image. In FIG. 3 is depicted the rounded-over result when printed on a given printer. FIG. 4 shows the bit image compensation which when printed will yield the desired result as depicted in FIG. 2 above. Note the ears 2 added to the outside corners and the ink trap 4 added to address the inside corner. FIG. 1 also illustrates bit image data/bit image compensation and the resulting printed image for outside corners.

The following patents and patent applications appear to be relevant to manipulation and enhancement of the edges of image shapes. They are incorporated by reference in their entirety for their teaching, particularly of template matching, and of bit map or signal substitution.

In U.S. Pat. No. 4,847,641 to Tung, print enhancement circuitry to enhance the printed image produced by a laser beam printer is interposed between the character generator circuits and the laser drive circuits to modify the laser drive signals provided by the character generator circuits. Bit data representing successive lines of the bit map for a desired image are stored in a first-in first-out (FIFO) buffer. The bit pattern sample window having a central cell (bit) and a selected (arbitrary) number of neighboring bits is compared to a number of matching bit patterns or templates, each of which is associated with an error element or cell. When a logic matching network detects a match, a modification signal associated with a unique compensation cell (bit) is generated. The sample window central bit is then replaced (modified) with the unique compensation bit required by the matching template. In this manner, all bits in a desired bit map, or set of bit maps, are examined and their corresponding laser drive signals modified to compensate for the errors associated with the matched templates in a piece-wise manner.

In U.S. Pat. No. 5,383,036 to Mailloux et al., a method for enhancing the contour fidelity of printed images of two or more colors is described, which includes obtaining a digital representation of the color image and finding color separations of each color. Each color separation is enhanced by a single set of inverse symmetrical templates, the set including templates in which the second template is always the inverse of the first, and the third and fourth templates are 180 degree rotations of the first two. The resulting smoothed color separations are recombined into an enhanced image without separation error.

U.S. Pat. No. 4,437,122 to Walsh et al. discloses methods to enhance the resolution and quality of characters of a system receiving the information initially in the form of video display pixels and providing hard copy output. This is accomplished by storing at least three successive lines of video data in successive, parallel connected shift registers, applying the outputs of the shift registers to a decoder, and generating driving signals for the printer head. The decoder compares the pixels on the same line as well as in preceding and succeeding lines that surround each specific input pixel to generate the printer head driving signals according to whether straight or curved line segments are to be formed. In effect, the printer increases the density of the information elements and simultaneously provides rounding off of character edges and smoothing of diagonals.

U.S. patent application Ser. No. 12/609,475 to Zhang et al. discloses a SUSAN based method to corner sharpening, wherein the method determines whether or not image pixels are associated with a corner as a function of the USAN values generated for the image pixels. Subsequently, one or more pixels associated with a corner are modified to render a corner enhanced image.

There exists a need for techniques which can be easily optimized and provide information on orientation and connectivity. Further, it is desirable to implement corner sharpening techniques utilizing one stage of buffer memory.

INCORPORATION BY REFERENCE

U.S. Pat. No. 7,636,480, by Zhang et al., entitled "SUPER RESOLUTION ENCODING," issued Dec. 22, 2009.

U.S. Pat. No. 7,539,351, by Xu et al., entitled "MODEL-BASED LINE WIDTH CONTROL," issued May 26, 2009.

U.S. Pat. No. 7,518,618, by Loce et al., entitled "ANTI-ALIASED TAGGING USING LOOK-UP TABLE EDGE PIXEL IDENTIFICATION," issued Apr. 14, 2009.

U.S. Pat. No. 6,144,461, by Crean et al., entitled "METHOD FOR GENERATING RENDERING TAGS TO FACILITATE THE PRINTING OF ANTIALIASED IMAGES," issued Nov. 7, 2000.

U.S. Pat. No. 5,383,036, by Mailloux et al., entitled "ENHANCEMENT OF MULTIPLE COLOR IMAGES WITHOUT COLOR SEPARATION ERROR BY INVERSE SYMMETRICAL TEMPLATE MATCHING," issued Jan. 17, 1995.

U.S. Pat. No. 4,847,641, by Tung, entitled "PIECE-WISE PRINT IMAGE ENHANCEMENT FOR DOT MATRIX PRINTERS," issued Jul. 11, 1989.

U.S. Pat. No. 4,437,122 by Walsh et al., entitled "LOW RESOLUTION RASTER IMAGES," issued Mar. 13, 1984.

"SUSAN—A New Approach to Low Level Image Processing," Stephen M. Smith, J. Michael Brady, *International Journal of Computer Vision* 23(1), 45-78 (1997).

*Digital Typography: An Introduction to Type and Composition for Computer System Design*, p 78-79, Richard Rubinstein, Addison-Wesley, 1988.

BRIEF DESCRIPTION

In one embodiment of this disclosure, described is an image processing method for corner enhancing a digital image received by an image processing system for rendering on an image output device, the method comprising a) receiving a digital image including a plurality of pixels representing an image to be rendered on the image output device; b) selecting a target pixel among the plurality of pixels; c) defining a plurality of vector windows, each vector window including the target pixel and one or more other pixels about the target pixel, the plurality of vector windows collectively covering substantially all pixels about the target pixel; d) determining the pixel values of each pixel within each vector window; e) determining if the target pixel is an inside corner pixel or an outside corner pixel connected to a corner of the digital image as a function of the pixel values within the vector windows; and f) if step e) determines the target pixel is an inside corner pixel or an outside corner pixel connected to a corner of the digital image, modifying the target pixel to generate a corner enhanced digital image which renders an image with enhanced corners on the image output device relative to the image received by the image processing system.

In another embodiment of this disclosure, described is a computer program product comprising a computer-usable data carrier storing instructions that, when executed by a computer, cause the computer to perform an image processing method for corner enhancing a digital image received by an image processing system for rendering on an image output device, the method comprising a) receiving a digital image including a plurality of pixels representing an image to be rendered on the image output device; b) selecting a target pixel among the plurality of pixels; c) defining a plurality of vector windows, each vector window including the target pixel and one or more other pixels about the target pixel, the plurality of vector windows collectively covering substantially all pixels about the target pixel; d) determining the pixel values of each pixel within each vector window; e) determining if the target pixel is an inside corner pixel or an outside corner pixel connected to a corner of the digital image as a function of the pixel values within the vector windows; and f) if step e) determines the target pixel is an inside corner pixel or an outside corner pixel connected to a corner of the digital image, modifying the target pixel to generate a corner enhanced digital image which renders an image with enhanced corners on the image output device relative to the image received by the image processing system.

In still another embodiment of this disclosure, described is a printing apparatus comprising an image marking device for rendering a color image on a media substrate; and a controller configured to receive a digital image for printing on the image marking device, the controller configured to execute instructions to perform an image processing method for corner enhancing a digital image received by the controller for rendering on the image output device, the method comprising a) receiving a digital image including a plurality of pixels representing an image to be rendered on the image output device; b) selecting a target pixel among the plurality of pixels; c) defining a plurality of vector windows, each vector window including the target pixel and one or more other pixels about the target pixel, the plurality of vector windows collectively covering substantially all pixels about the target pixel; d) determining the pixel values of each pixel within each vector window; e) determining if the target pixel is an inside corner pixel or an outside corner pixel connected to a corner of the digital image as a function of the pixel values within the vector windows; and f) if step e) determines the target pixel is an inside corner pixel or an outside corner pixel connected to a corner of the digital image, modifying the target pixel to generate a corner enhanced digital image which renders an image with enhanced corners on the image output device relative to the image received by the image processing system.

DETAILED DESCRIPTION

Disclosed is a low-complexity corner sharpening method based on simple Boolean logic applied to 4 vector windows. Substantively, the method and associated algorithm can be described by 3 steps: (1) Determine corner candidates via counting pixel values in a 2-D window. This step is optional, but adds some robustness to the algorithm. (2) Apply Boolean logic to 4 vector windows to tag the various types of corner pixels. The logic is a simple matching of patterns that are foreground on one side and background on the other. (3) Modify the corners as required by the marking process and customer preference, and as directed by the tags.

The disclosed algorithms are capable of uniquely identifying inside and outside corners, as well as strongly and weakly connected corner pixels. The disclosed algorithms also provide important additional information on corner orientation and the type of connectivity.

Figure 9:
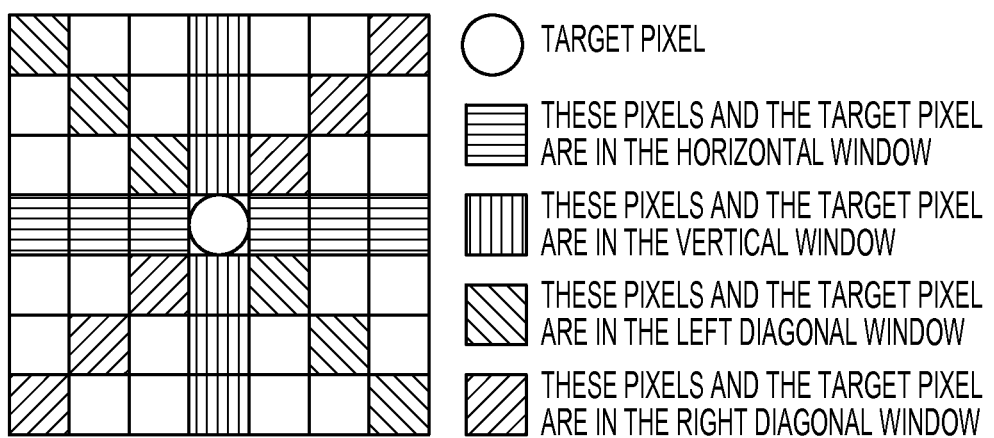
FIG. 9 illustrates an exemplary method of implementing a plurality of vector windows according to this disclosure.

Now described are the three steps discussed above in more detail. According to one exemplary embodiment of this disclosure, a 7×7 pixel observation window is used to determine candidate corner pixels and four 7×1 vector sub-windows inside the observation window are used to uniquely identify corner type. The vector sub-windows are shown in FIG. 9. While the method is described with that window configuration, this disclosure and the exemplary embodiments herein are not limited to those particular window dimensions.

In processing the image, the observation window steps to each pixel to be processed (target pixels), and applies the first two steps to identify corners at those pixels. The third step subsequently modifies the tagged pixels according to the characteristics of the marking process and customer preference.

Additional supplied tags could provide further guidance to the recognition and sharpening. For instance, tags based on digital segmentation or PDL objects could deactivate the method for image types such as pictorials and tints.

Step (1) Determine Corner Candidate Pixels Via Counting Pixel Values in a 2-D Window.

As previously indicated, this step is optional, but adds some robustness to the algorithm.

Assuming a bi-level image, a pixel count of the two pixel types, light and dark are performed using the pixels in the full square window, i.e. the 7×7 pixel observation window.

$C_H$=Count of pixels having the high value (dark)
$C_L$=Count of pixels having the low value (light).

With reference to FIGS. 5-8, illustrated are examples of determining corner candidate pixels via counting pixel values in a 2-D window. A 2-D window of 7×7 pixels is used, where the cases of foreground count/background count—0.75, 0.225, 0.225 and 0.195, respectively, are illustrated.

As shown, the pixel type that is in the majority is labeled as "background" and the type in the minority is labeled as "foreground." It is important to note that labeling a target pixel as a foreground type or background type is relative to the observation window only. In other words, the label of foreground and background, as used throughout this disclosure, does not refer to the foreground or background of a rendered, i.e. printed image. This step determines whether the background of the image portion being processed is dark or light. In addition, please note that according to the terminology used here, only "background" pixels are modified by the subsequent sharpening operation.

An image structure must be sufficiently acute to be considered a corner. Employed is a test related to acuteness to determine if a target pixel is a candidate for corner sharpening modification. The test compares the ratio of counts to a threshold T.

Foreground pixel count=MIN[$C_H$, $C_L$]
Background pixel count=MAX[$C_H$, $C_L$]
If MIN[$C_H$, $C_L$]/MAX[$C_H$, $C_L$]<T, then the pixel is a candidate, where $C_H$ is equal to the number of pixels with high values (i.e. dark pixels) and $C_L$ is equal to the number of pixels with low values (i.e. light pixels).

Figure 1:
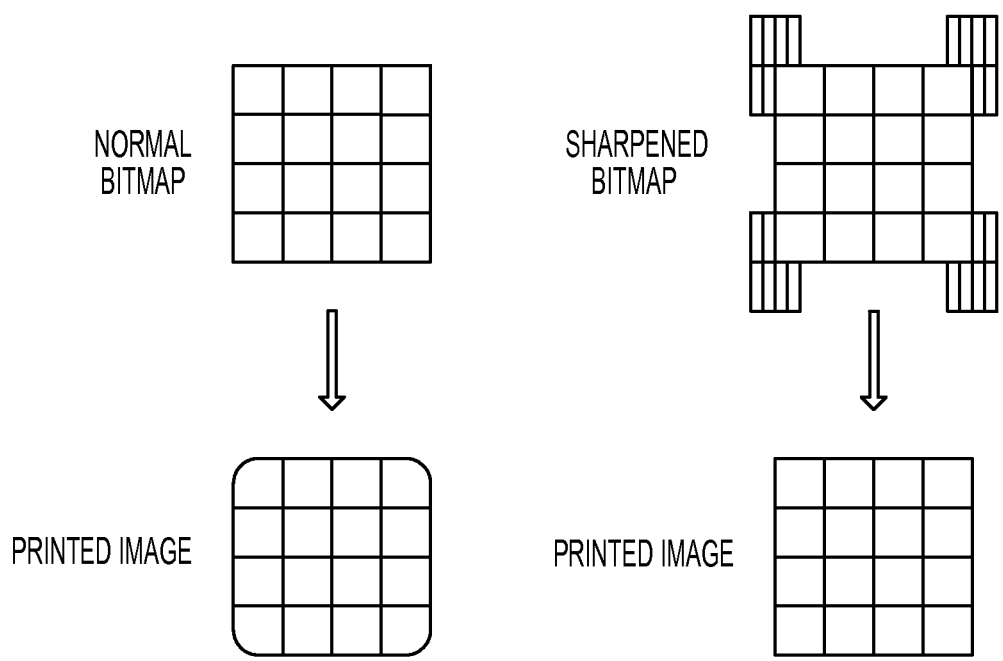
FIG. 1 is schematics of printing with unenhanced and enhanced corners.
Figure 2:
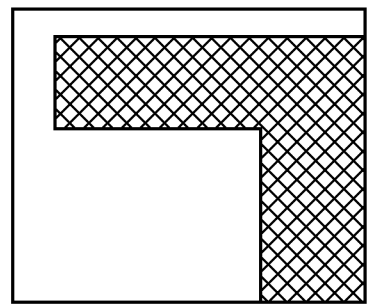
FIGS. 2, 3 and 4 depict prior art for corner sharpening.
Figure 3:
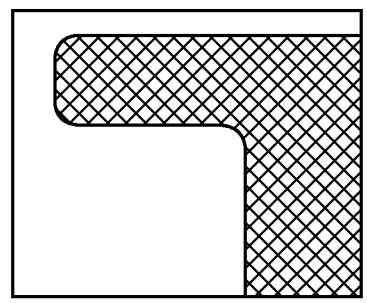
Figure 4:
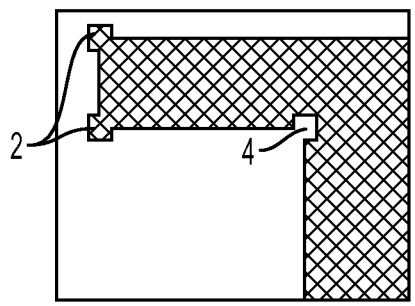
Figure 5:
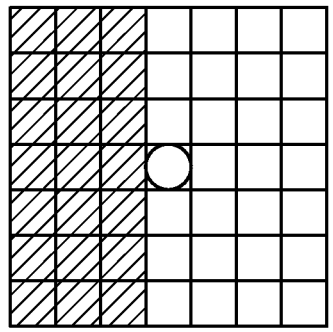
FIGS. 5-8 illustrate an exemplary method of counting background and foreground pixels to determine if a target pixel is a candidate for corner enhancement processing.

For example, with reference to FIG. 5, illustrated is a 7×7 observation window centered on a target pixel adjacent a vertical edge. The foreground pixel count=MIN[$C_H$, $C_L$]=21 and the background pixel count=MAX[$C_H$, $C_L$]=28. Here, the background pixels within the observation window are, by definition, light pixels and the foreground pixels within the observation window are, by definition, dark pixels. The ratio of the foreground pixel count to the background pixel count is equal to 0.75.

Figure 6:
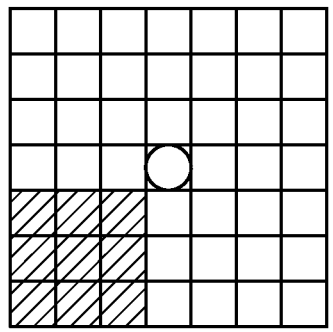

FIG. 6 illustrates another example where the 7×7 observation window is centered on a target pixel which is adjacent to the tip of a 90° corner. The foreground pixel count=MIN[$C_H$, $C_L$]=9 and the background pixel count=MAX[$C_H$, $C_L$]=40. Here, the background pixels within the observation window are, by definition, light pixels and the foreground pixels within the observation window are, by definition, dark pixels. The ratio of the foreground pixel count to the background pixel count is equal to 0.225.

Figure 7:
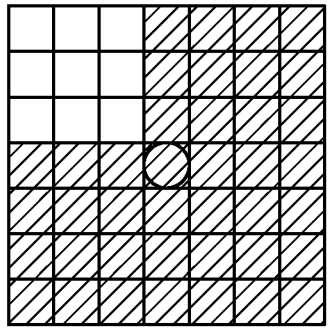

FIG. 7 illustrates a third example where the 7×7 observation window is centered on a target pixel which is inside and adjacent to the tip of a 90° corner. The foreground pixel count=MIN[$C_H$, $C_L$]=9 and the background pixel count=MAX[$C_H$, $C_L$]=40. Here, unlike FIGS. 5 and 6, the background pixels within the observation window are, by definition, dark pixels and the foreground pixels within the observation window are by definition, light pixels. The ratio of the foreground pixel count to the background pixel count is equal to 0.225.

Figure 8:
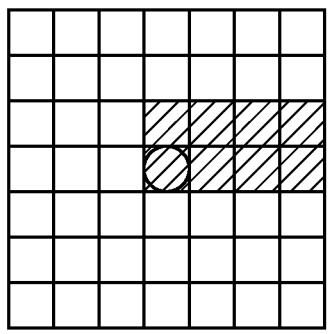

FIG. 8 illustrates a fourth example where the observation window is centered on a target pixel which is inside and adjacent to the tip of a 90° corner. The foreground pixel count=MIN[$C_H$, $C_L$]=8 and the background pixel count=MAX[$C_H$, $C_L$]=41. Here, the background pixels within the observation window are, by definition, light pixels and the foreground pixels with the observation window are by definition, dark pixels.

As can be seen in FIGS. 5-8, intuitively, as the foreground pixel count increases, the likelihood of the window being centered on a pixel adjacent to a corner region decreases. The optimal counts for corner and serif structure ideally depend on font size. Hence, if information about the image characteristics (i.e. font size) is available via image metadata, the threshold can be dynamically set in order to avoid false rejections of image areas that are corners but may be mistakenly disregarded. The threshold value used in the examples presented in this disclosure was T=0.3. Referring again to FIGS. 5-8, a threshold value T=0.3 determines that the target pixels associated with FIGS. 6, 7 and 8 are candidate pixels for subsequent processing according to step (2).

Step (2) Apply Boolean Logic to 4 Vector Windows to Tag the Various Types of Corner Pixels This operation performs a simple matching of patterns that are foreground on one side and background on the other of each vector window. According to one exemplary embodiment, a simple implementation provides the same tag for multiple pixel configurations, while a fully featured process according to another exemplary embodiment provides unique tags based on inside (dark) and outside (light) locations relative to a corner, and strong- and weak-connectivity relative to a corner.

FIG. 9 illustrates one example of a four-vector window configuration. According to this exemplary embodiment, the vector windows cover a 7×7 pixel window, centered on a selected target pixel. Included are a horizontal vector window, a vertical vector window, a left diagonal vector window and a right diagonal vector window. Each vector window is centered on the target pixel and collectively, the plurality of vector windows cover the vertical, horizontal, and diagonal pixel neighbors within the 7×7 observation window about the target pixel.

Figure 10:
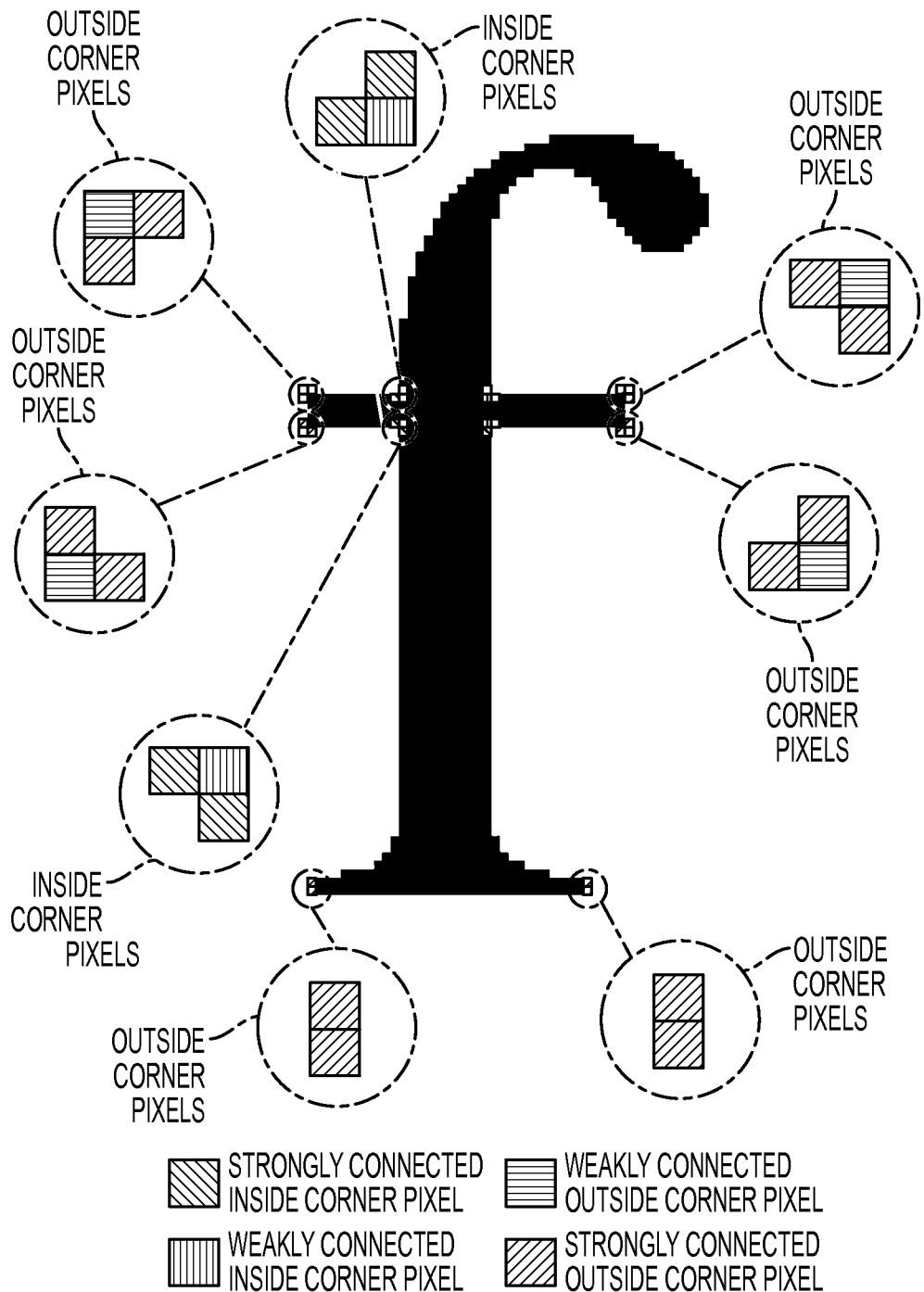
FIG. 10 illustrates a Times character processed according to an exemplary corner enhancement method according to this disclosure.

Operatively, the 4 vector window process evaluates each vector window within the observation window centered on the target pixel to determine if the target pixel is associated with a corner and, assuming it is associated with a corner, what type of corner pixel is the target pixel. With reference to FIG. 10, illustrated are examples of the types of corner pixels. Specifically, a corner pixel may be a weakly connected inside (dark) pixel, a weakly connected outside (light) pixel, a strongly connected inside (dark) pixel, or a strongly connected outside (light) pixel.

Weakly Connected Pixels:

If the horizontal, vertical and one diagonal vector windows about the target pixel are located in the background of the observation window, the pixel values in other diagonal window have the shape of a step transition from the background of the observation window to the foreground of the observation window at the target pixel, and the target pixel is in the background, the target pixel is considered a weakly connected corner pixel. More specifically, it is a weakly connected outside pixel if the target pixel is light and a weakly connected inside pixel if the target pixel is dark.

Strongly Connected Pixels:

If both diagonal vector windows and one of the vertical and horizontal vector windows are totally located in the background of the observation window, the pixel values in one of the vertical and horizontal vector windows has the shape of a step transitioning from the background of the observation window to the foreground of the observation window at the target pixel, and the target pixel is in the background, the target pixel is considered a strongly connected corner pixel. More specifically, it is a strongly connected outside pixel if the target pixel is light and a strongly connected inside pixel if the target pixel is dark. One example of a corner pixel qualified under this test is a pixel adjacent to the end of a single pixel line.

Also, if two out of the four vector windows about the target pixel are located in the background of the observation window and the pixel values in two angularly adjacent vector windows (i.e., either the horizontal and one diagonal vector window, or the vertical window and one diagonal vector window) have the shape of a step transitioning from the background of the observation window to the foreground of the observation window at the target pixel, and the target pixel is in the background, the target pixel is considered a strongly connected corner pixel including a weak (diagonal) connection. More specifically, it is a strongly connected outside pixel including a weak connection if the target pixel is light and a strongly connected inside pixel including a weak connection if the target pixel is dark.

FIG. 10 shows examples of strongly and weakly connected outside corner pixels and inside corner pixels identified via the logic discussed above for an 8-point Times character at 12 dpi.

Step (3) Modify the Corners as Required by the Marking Process and Customer Preference, and as Directed by the Tags This operation utilizes the corner identifiers found in step 2 to modify pixel values about the corner. For instance, this step can operate by examining the generated tags, or recognition output of the previous step to determine if a current target pixel is a type of corner pixel requiring modification. Pixels identified with different tags can be altered differently. For instance, weakly connected outside corner pixels may be turned "on" and weakly connected inside corner pixels may be set "off." Laser power may be varied for the different types of corner pixels to give the desired effect. If converting to high addressability, high resolution, or pulse width modulation, the identified pixels may be partially filled. The previous step could also provide left, right, top, bottom, type orientations to indicate a direction of desired growth or erosion. The exact treatment is optimized based on empirical tests on bit maps and print tests with the given marking process.

Figure 11:
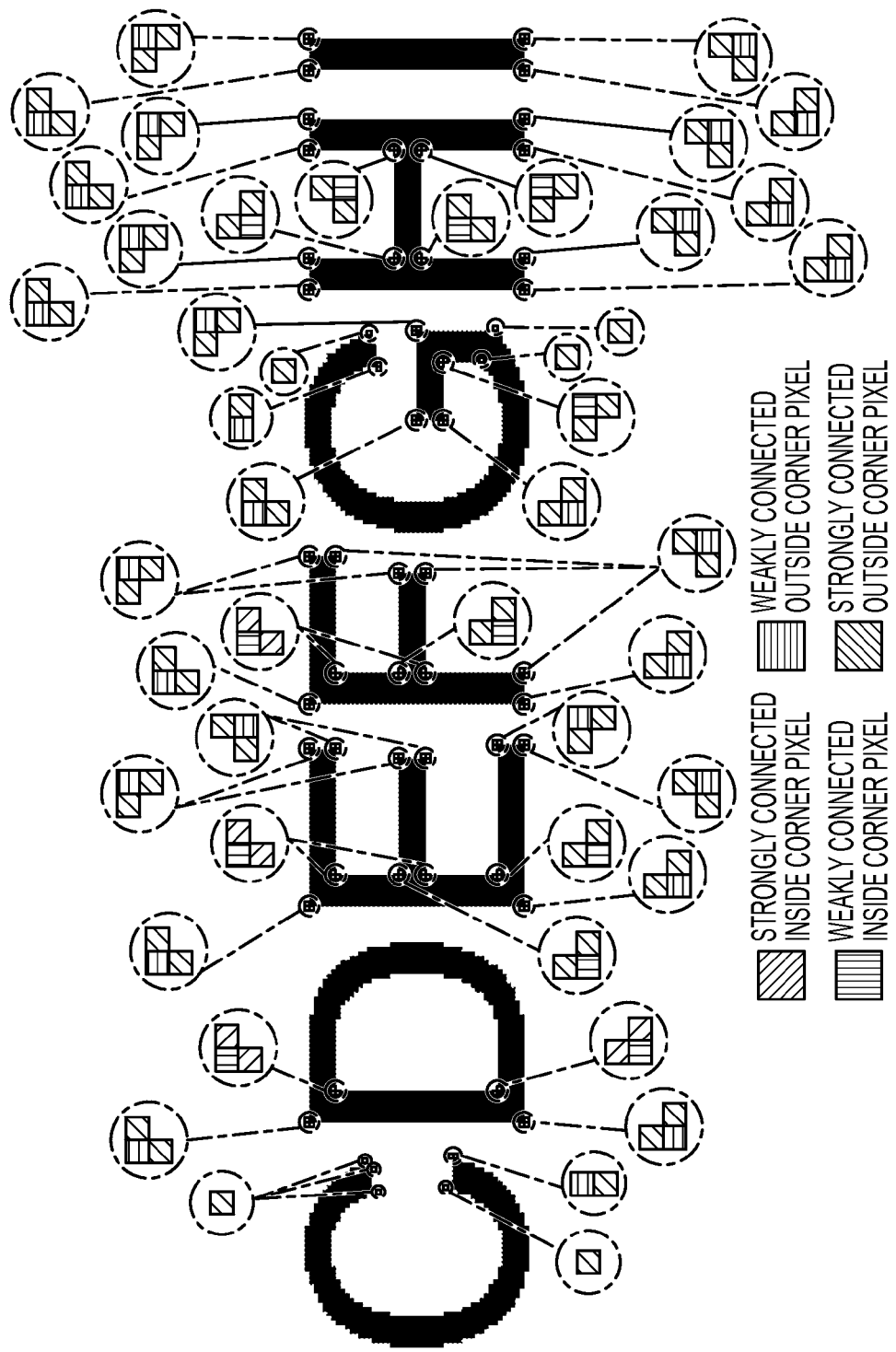
FIG. 11 illustrates pixel tagging results for a set of Arial characters processed according to an exemplary embodiment of this disclosure.

FIG. 11 shows the results of the algorithm described hereto applied to 8 point Arial characters.

Figure 12:
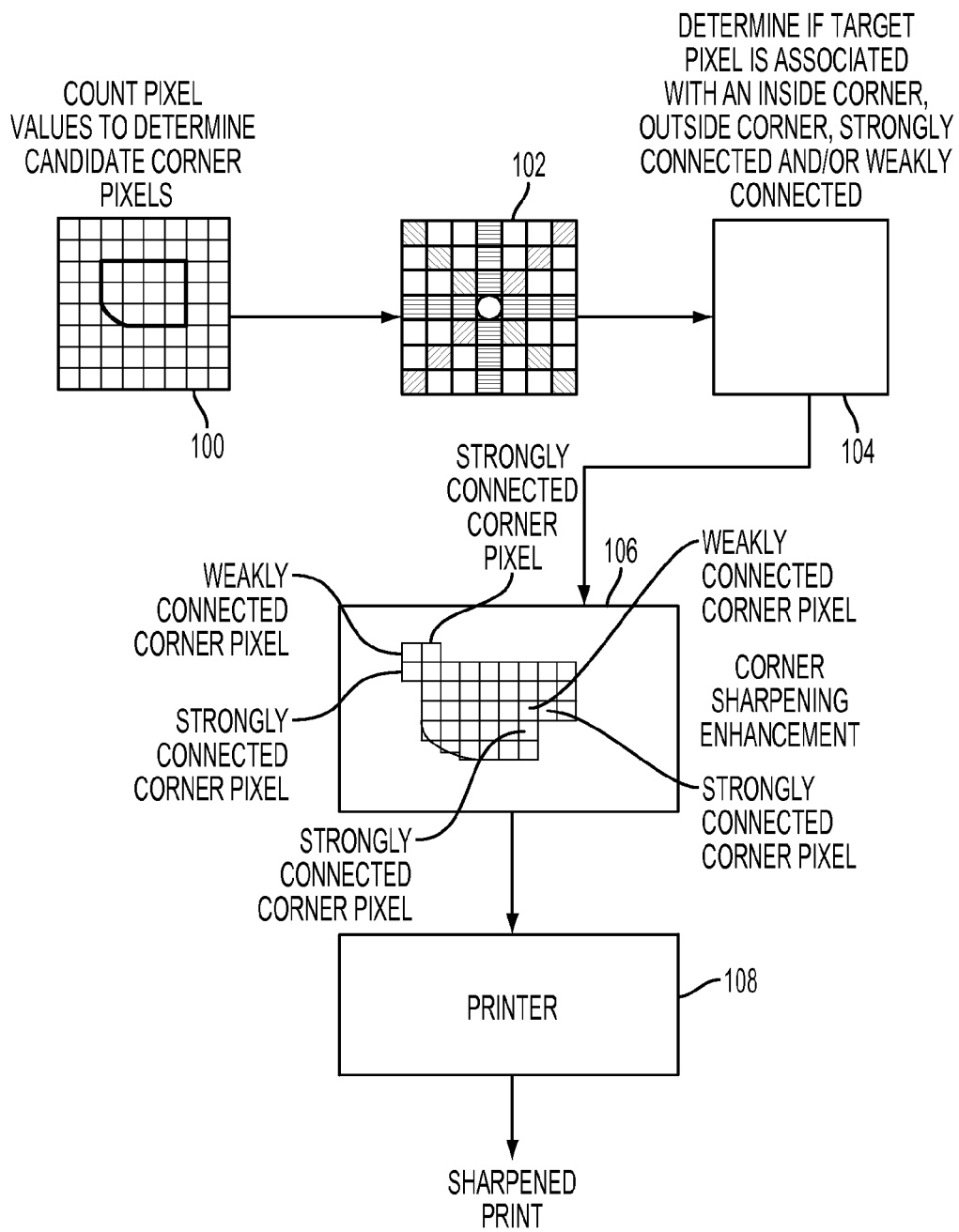
FIG. 12 illustrates an exemplary method of corner enhancement according to this disclosure.

With reference to FIG. 12, illustrated is a flow chart of an image processing method for corner enhancing a digital image received by an image processing system for rendering on an image output device, for example a printer. In operation, the image processing method includes the following processes/steps:

1) the image processing system receives a digital image including a plurality of pixels representing an image to be rendered on a printer;

2) the image processing system executes process 100 to count pixel values within an observation window. The size and shape of the observation window is not limited to a specific shape or size. For example, the observation window can be squarely shaped, i.e. 2×2 pixels, 3×3 pixels, 5×5 pixels, etc. Other examples include rectangles, diamonds, and partial sampling within a large window—that is, for example, you may chose to not count all pixels within a 9×9 window. To determine candidate corner pixels for corner sharpening, the image processing system selects a target pixel among the plurality of pixels determined in step 2);

3) the image processing system defines a plurality of vector windows within a predetermined observation window by executing process 102. The predetermined observation window may or not be a subset of the window that is used for counting. Notably, each vector window includes the target pixel and one or more other pixels about the target pixel and the plurality of vector windows collectively cover substantially all pixels about the target pixel. Also, the plurality of vectors may or not be of different lengths. For example, there may be some advantage to having longer V and H windows for purposes such as avoiding the extension of a corner below a text line or into a neighboring image structure;

4) the image processing system executes process 104 to determine the pixel values of each pixel within each vector window and determines if a target pixel is an inside corner pixel, outside corner pixel, strongly connected pixel and/or weakly connected pixel and tagging the target pixels accordingly; and 5) the image processing system executes process 106 to modify one or more pixels tagged as an inside corner pixel or an outside corner pixel to render a sharpened print of the digital image on the printer 108.

There are several image path embodiments which enable the execution of the corner sharpening processes discussed hereto. A few of these image path embodiments are discussed below, however, as will be recognized by those in the art of image processing, the disclosed corner sharpening processes are not limited to these image path embodiments and others are within the scope of this disclosure.

According to one image path embodiment which utilized tags, the tagging and corner sharpening enhancement process can be applied within one module or by respective modules located at different points within the image path. For example, the tagging may be performed in a Digital Front End (DFE) operatively connected to the image path and the corner sharpening enhancement process may be located downstream within a printing engine.

According to another image path embodiment which does not include the complexity of anti-aliasing (AA), an image can be received at a resolution such a 1200 spi (spots per inch), processed by steps 1)-3) as described above to provide corner enhancement, and finally output an image with sharpened corners at 1200 spi or a higher resolution.

According to another image path embodiment, super resolution AA performs the recognition and enhancement of corner pixels prior to the averaging AA step. Rendering modules within the print engine, such as AAT [see Anti-Aliased tagging references U.S. Pat. Nos. 6,144,461, 6,167,166, 6,243, 499, 7,518,618] and AAR [see Anti-Aliased Rendering references U.S. Pat Nos. 6,167,166, 6,243,499], may reconstruct the corner sharpening structures that were turned to gray in the AA step.

According to another image path embodiment employing super resolution encoding (SRE) and super resolution decoding (SRD) [see reference U.S. Pat. No. 7,636,480], the corner enhancement may be performed in a DFE prior to the SRE process. Rendering within the print engine via SRD reconstructs the corner sharpening structures that were encoded in the DFE.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An image processing method for corner enhancing a digital image received by an image processing system for rendering on an image output device, the method comprising:
    a) receiving a digital image including a plurality of pixels representing an image to be rendered on the image output device;
    b) selecting a target pixel among the plurality of pixels;
    c) defining a plurality of vector windows, each vector window including the target pixel and one or more other pixels about the target pixel, the plurality of vector windows collectively covering substantially all pixels about the target pixel;
    d) determining the pixel values of each pixel within each vector window:
    e) determining if the target pixel is an inside corner pixel or an outside corner pixel connected to a corner of the digital image as a function of the pixel values within the vector windows; and
    f) if step e) determines the target pixel is an inside corner pixel or an outside corner pixel connected to a corner of the digital image, modifying the target pixel to generate a corner enhanced digital image which renders an image with enhanced corners on the image output device relative to the image received by the image processing system,
    wherein step c) includes:
    defining a plurality of 1-dimensional vector windows, each vector window including the target pixel and two or more other pixels connected to the target pixel, the plurality of vector windows collectively covering substantially all pixels connected to the target pixel and the plurality of vector windows including a vertical vector window, a horizontal vector window, a first diagonal vector window and a second diagonal vector window, and
    wherein step e) includes:
       e1) attributing each of the pixels within the plurality of vector windows as either a foreground pixel or a background pixel relative to an observation window;
       e2) attributing a target pixel as a corner pixel if the target pixel is a background pixel and one of the following conditions are true:
          1) three out of the four vector windows include only background pixels, and the fourth vector window includes background and foreground pixels; or
          2) two out of the four vector windows include only background pixels, and either the horizontal vector window and one of the first and second diagonal vector windows include background and foreground pixels, or the vertical vector window and one of the first and second diagonal vector windows include background and foreground pixels.

2. The image processing method according to claim 1, step b) comprising:
    b1) selecting a portion of the digital image for corner detection, the portion including a plurality of pixels associated with the image; and
    b2) selecting a target pixel within the selected portion, wherein steps b)-f) are performed for each pixel included in the portion of the digital image.

3. The image processing method according to claim 1, step d) comprising:
    attributing each pixel within each vector window as a foreground pixel or a background pixel relative to an observation window; and
    step e) comprising:
    determining if the target pixel is an inside corner pixel or an outside corner pixel connected to a corner of the digital image as a function of the pixel values within the vector windows, wherein the function evaluates the number of vector windows including only background pixels, the number of vector windows including only foreground pixels and the number of vector windows including both background and foreground pixels.

4. The image processing method according to claim 1, step e2) further comprising:
    attributing a target pixel as a weakly connected outside corner pixel if the background pixels are light, relative to the foreground pixels, the target pixel is light, three out of the four vector windows include only background (light) pixels and the fourth vector window is the first or second diagonal and the fourth vector window includes a background (light) pixel connected to the target pixel and a foreground (dark) pixel connected to the target pixel.

5. The image processing method according to step 1, step e2) further comprising:
    attributing a target pixel as an outside pixel strongly connected to a single pixel line if the background pixels are light, relative to the foreground pixels, the target pixel is light, three out of the four vector windows include only background (light) pixels, the fourth vector window is the horizontal vector window or the vertical vector window, and the fourth vector window includes background (light) pixels connected to the target pixel and a foreground (dark) pixel connected to the target pixel.

6. The image processing method according to claim 1, step e2) further comprising:
    attributing a target pixel as a strongly connected outside corner pixel if the background pixels are light relative to the foreground pixels, the target pixel is light, two out of the four vector windows include only background pixels, and either the horizontal vector window and one of the first and second diagonal vector windows include background (light) and foreground (dark) pixels, or the vertical vector window and one of the diagonal vector windows include background (light) and foreground (dark) pixels.

7. The image processing method according to claim 1, step e2) further comprising:
attributing a target pixel as a weakly connected inside corner pixel if the background pixels are dark relative to the foreground pixels, the target pixel is dark, three out of the four vector windows include only background (dark) pixels, the fourth vector window is the first or second diagonal vector window, and the fourth vector window includes a background (dark) pixel connected to the target pixel and a foreground (light) pixel connected to the target pixel.

8. The image processing method according to claim 1, step e2) further comprising:
attributing a target pixel as a strongly connected inside pixel if the background pixels are dark relative to the foreground pixels, the target pixel is dark, two out of the four vector windows include only background pixels, and either the horizontal vector window and one of the first and second diagonal vector windows include background (dark) and foreground (light) pixels, or the vertical vector window and one of the first and second diagonal vector windows include background (dark) and foreground (light) pixels.

9. An image processing method for corner enhancing a digital image received by an image processing system for rendering on an image output device, the method comprising:
a) receiving a digital image including a plurality of pixels representing an image to be rendered on the image output device;
b) selecting a target pixel among the plurality of pixels;
c) defining a plurality of vector windows, each vector window including the target pixel and one or more other pixels about the target pixel, the plurality of vector windows collectively covering substantially all pixels about the target pixel;
d) determining the pixel values of each pixel within each vector window:
e) determining if the target pixel is an inside corner pixel or an outside corner pixel connected to a corner of the digital image as a function of the pixel values within the vector windows; and
f) if step e) determines the target pixel is an inside corner pixel or an outside corner pixel connected to a corner of the digital image, modifying the target pixel to generate a corner enhanced digital image which renders an image with enhanced corners on the image output device relative to the image received by the image processing system,
wherein step b) includes:
b1) selecting a target pixel among the plurality of pixels;
b2) determining if the target pixel is a corner candidate pixel;
b3) if the target pixel is a corner candidate pixel, proceeding to step c.

10. The image processing method according to claim 9, step b2) comprising:
defining a two-dimensional pixel window with an origin at the target pixel;
counting the number of pixels within the window which are of a type including a relatively low intensity (light) ($C_L$) and the number of pixels within the window which are of a type including a relatively high intensity (dark) ($C_H$);
defining the background as including pixels with an intensity type in the majority and the foreground as including pixels with an intensity type in the minority, where the background and foreground are defined relative to the two-dimensional pixel window;
calculating a ratio of MIN $[C_H, C_L]$/MAX $[C_H, C_L]$ and comparing the ratio to a threshold T to determine if the target pixel is a corner candidate pixel.

11. The image processing method according to claim 10, wherein the threshold T is a function of one or more image characteristics associated with the digital image.

12. The image processing method according to claim 9, further comprising:
performing steps b)-f) for a plurality of target pixels selected among the plurality of pixels representing an image to be rendered on the image output device.

13. The image processing method according to claim 12, step f) further comprising:
determining the orientation of one or more corners associated with target pixels determined to be inside corner pixels or outside corner pixels, and modifying the target pixels as a function of the associated corner orientation to generate a corner enhanced digital image which renders an image with enhanced corners on the image output device relative to the image received by the image processing system.

14. A computer program product comprising a non-transitory computer-usable data carrier storing instructions that, when executed by a computer, cause the computer to perform an image processing method for corner enhancing a digital image received by an image processing system for rendering on an image output device, the method comprising:
a) receiving a digital image including a plurality of pixels representing an image to be rendered on the image output device;
b) selecting a target pixel among the plurality of pixels;
c) defining a plurality of vector windows, each vector window including the target pixel and one or more other pixels about the target pixel, the plurality of vector windows collectively covering substantially all pixels about the target pixel;
d) determining the pixel values of each pixel within each vector Window;
e) determining if the target pixel is an inside corner pixel or an outside corner pixel connected to a corner of the digital image as a function of the pixel values within the vector windows; and
f) if step e) determines the target pixel is an inside corner pixel or an outside corner pixel connected to a corner of the digital image, modifying the target pixel to generate a corner enhanced digital image which renders an image with enhanced corners on the image output device relative to the image received by the image processing system,
wherein step d) includes:
attributing each pixel within each vector window as a foreground pixel or a background pixel relative to an observation window; and
wherein step e) includes:
determining if the target pixel is an inside corner pixel or an outside corner pixel connected to a corner of the digital image as a function of the pixel values within the vector windows, wherein the function evaluates the number of vector windows including only background pixels, the number of vector windows including only foreground pixels and the number of vector windows including both background and foreground pixels.

15. The computer program product according to claim 14, step c) comprising:
defining a plurality of 1-dimensional vector windows, each vector window including the target pixel and two or more other pixels connected to the target pixel, the plurality of vector windows collectively covering substantially all pixels connected to the target pixel and the plurality of vector windows including a vertical vector window, a horizontal vector window, a first diagonal vector window and a second diagonal vector window.

16. A printing apparatus comprising:

an image marking device for rendering a color image on a media substrate; and a controller configured to receive a digital image for printing on the image marking device, the controller configured to execute instructions to perform an image processing method for corner enhancing a digital image received by the controller for rendering on the image output device, the method comprising:

a) receiving a digital image including a plurality of pixels representing an image to be rendered on the image output device;

b) selecting a target pixel among the plurality of pixels;

c) defining a plurality of vector windows, each vector window including the target pixel and one or more other pixels about the target pixel, the plurality of vector windows collectively covering substantially all pixels about the target pixel;

d) determining the pixel values of each pixel within each vector window;

e) determining if the target pixel is an inside corner pixel or an outside corner pixel connected to a corner of the digital image as a function of the pixel values within the vector windows; and f) if step e) determines the target pixel is an inside corner pixel or an outside corner pixel connected to a corner of the digital image, modifying the target pixel to generate a corner enhanced digital image which renders an image with enhanced corners on the image output device relative to the image received by the image processing system, wherein step d) includes:

attributing each pixel within each vector window as a foreground pixel or a background pixel relative to an observation window; and wherein step e) includes:

determining if the target pixel is an inside corner pixel or an outside corner pixel connected to a corner of the digital image as a function of the pixel values within the vector windows, wherein the function evaluates the number of vector windows including only background pixels, the number of vector windows including only foreground pixels and the number of vector windows including both background and foreground pixels.

17. The printing apparatus according to claim 16, step c) comprising:

defining a plurality of 1-dimensional vector windows, each vector window including the target pixel and two or more other pixels connected to the target pixel, the plurality of vector windows collectively covering substantially all pixels connected to the target pixel and the plurality of vector windows including a vertical vector window, a horizontal vector window, a first diagonal vector window and a second diagonal vector window.

18. A printing apparatus comprising:

an image marking device for rendering a color image on a media substrate; and a controller configured to receive a digital image for printing on the image marking device, the controller configured to execute instructions to perform an image processing method for corner enhancing a digital image received by the controller for rendering on the image output device, the method comprising:

a) receiving a digital image including a plurality of pixels representing an image to be rendered on the image output device;

b) selecting a target pixel among the plurality of pixels;

c) defining a plurality of vector windows, each vector window including the target pixel and one or more other pixels about the target pixel, the plurality of vector windows collectively covering substantially all pixels about the target pixel;

d) determining the pixel values of each pixel within each vector window;

e) determining if the target pixel is an inside corner pixel or an outside corner pixel connected to a corner of the digital image as a function of the pixel values within the vector windows; and f) if step e) determines the target pixel is an inside corner pixel or an outside corner pixel connected to a corner of the digital image, modifying the target pixel to generate a corner enhanced digital image which renders an image with enhanced corners on the image output device relative to the image received by the image processing system, wherein step c) includes:

defining a plurality of 1-dimensional vector windows, each vector window including the target pixel and two or more other pixels connected to the target pixel, the plurality of vector windows collectively covering substantially all pixels connected to the target pixel and the plurality of vector windows including a vertical vector window, a horizontal vector window, a first diagonal vector window and a second diagonal vector window, and wherein step e) includes:

e1) attributing each of the pixels within the plurality of vector windows as either a foreground pixel or a background pixel relative to an observation window;

e2) attributing a target pixel as a corner pixel if the target pixel is a background pixel and one of the following conditions are true:

1) three out of the four vector windows include only background pixels, and the fourth vector window includes background and foreground pixels; or 2) two out of the four vector windows include only background pixels, and either the horizontal vector window and one of the first and second diagonal vector windows include background and foreground pixels, or the vertical vector window and one of the first and second diagonal vector windows include background and foreground pixels.

19. A printing apparatus comprising:

an image marking device for rendering a color image on a media substrate; and a controller configured to receive a digital image for printing on the image marking device, the controller configured to execute instructions to perform an image processing method for corner enhancing a digital image received by the controller for rendering on the image output device, the method comprising:

a) receiving a digital image including a plurality of pixels representing an image to be rendered on the image output device;

b) selecting a target pixel among the plurality of pixels;

c) defining a plurality of vector windows, each vector window including the target pixel and one or more other pixels about the target pixel, the plurality of vector windows collectively covering substantially all pixels about the target pixel;

d) determining the pixel values of each pixel within each vector Window;

e) determining if the target pixel is an inside corner pixel or an outside corner pixel connected to a corner of the digital image as a function of the pixel values within the vector windows; and f) if step e) determines the target pixel is an inside corner pixel or an outside corner pixel connected to a corner of the digital image, modifying the target pixel to generate a corner enhanced digital image which renders an image with enhanced corners on the image output device relative to the image received by the image processing system, wherein step c) includes:

defining a plurality of 1-dimensional vector windows, each vector window including the target pixel and two or more other pixels connected to the target pixel, the plurality of vector windows collectively covering substantially all pixels connected to the target pixel and the plurality of vector windows including a vertical vector window, a horizontal vector window, a first diagonal vector window and a second diagonal vector window, and wherein step b) includes:

b1) selecting a target pixel among the plurality of pixels;

b2) determining if the target pixel is a corner candidate pixel;

b3) if the target pixel is a corner candidate pixel, proceeding to step c.

20. The image processing method according to claim 1, further comprising:

performing steps b)-f) for a plurality of target pixels selected among the plurality of pixels representing an image to be rendered on the image output device.

21. The image processing method according to claim 20, step f) further comprising:

determining the orientation of one or more corners associated with target pixels determined to be inside corner pixels or outside corner pixels, and modifying the target pixels as a function of the associated corner orientation to generate a corner enhanced digital image which renders an image with enhanced corners on the image output device relative to the image received by the image processing system.

22. The image processing method according to claim 9, step b) comprising:

b1) selecting a portion of the digital image for corner detection, the portion including a plurality of pixels associated with the image; and b2) selecting a target pixel within the selected portion, wherein steps b)-f) are performed for each pixel included in the portion of the digital image.

23. The image processing method according to claim 9, step d) comprising:

attributing each pixel within each vector window as a foreground pixel or a background pixel relative to an observation window; and step e) comprising:

determining if the target pixel is an inside corner pixel or an outside corner pixel connected to a corner of the digital image as a function of the pixel values within the vector windows, wherein the function evaluates the number of vector windows including only background pixels, the number of vector windows including only foreground pixels and the number of vector windows including both background and foreground pixels.

* * * * *